Oct. 1, 1946. J. B. HAYS, JR 2,408,395
OBJECT LOCATING SYSTEM
Filed April 26, 1944 2 Sheets-Sheet 1
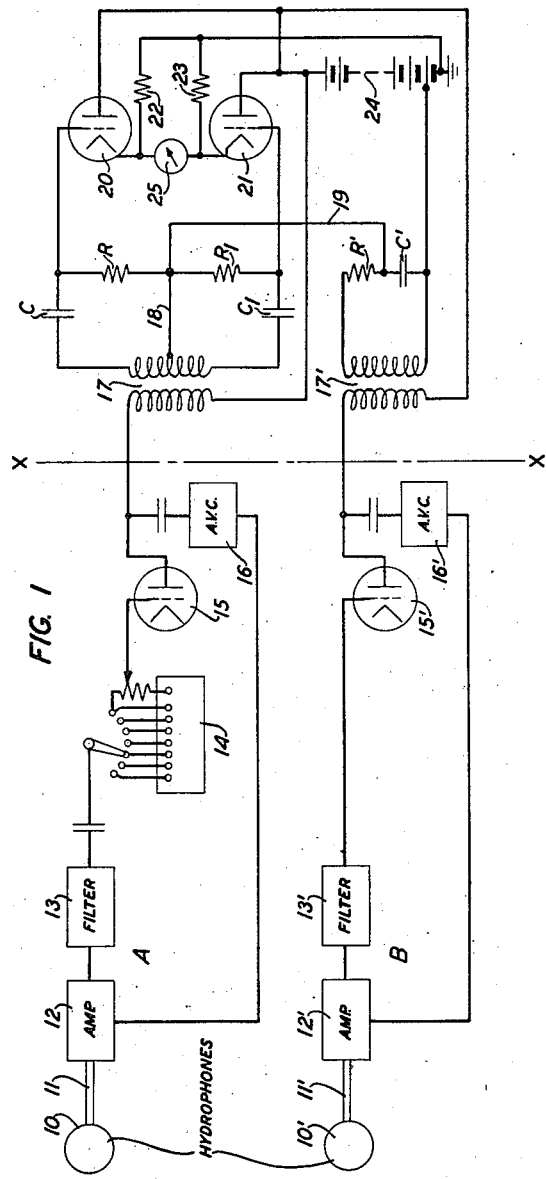
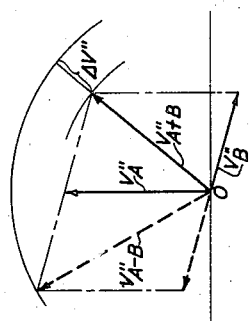
FIG. 4c
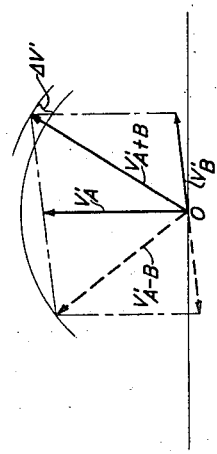
FIG. 4b
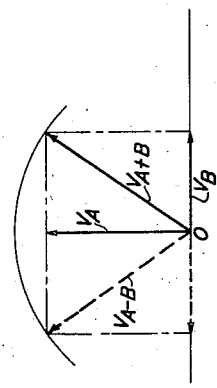
FIG. 4a
INVENTOR
J. B. HAYS, JR.
BY
B. H. Jackson
ATTORNEY

INVENTOR
J. B. HAYS, JR.
BY
ATTORNEY

UNITED STATES PATENT OFFICE 2,408,395

OBJECT LOCATING SYSTEM

James B. Hays, Jr., Summit, N. J., assignor, by mesne assignments, to Western Electric Company, Incorporated, New York, N. Y., a corporation of New York Application April 26, 1944, Serial No. 532,697

5 Claims. (Cl. 177—386)

This invention relates to object locating systems and particularly to those systems which depend upon the reception of compressional waves emanating from the object whose location it is desired to determine.

Heretofore systems of the general nature noted have been proposed based upon the binaural effect of sound waves impinging upon spaced microphones. These systems depend to a great extent upon human observations such as by noting the intensity of sound received or by the observation of maximum swing on an electrical instrument. The objections to such systems are well known and the results obtained by the use of such systems have not had the accuracy desired.

An object of the invention is the accurate location of a source of compressional waves.

Another object of the invention is to compare the electric currents in two separate channels by applying them to a common device in such a manner that the attainment of neutralization is sharply defined.

In one embodiment of the invention, the system comprises two spaced microphones adapted to receive the same signals. The outputs of the two microphones are amplified and filtered in individual electrical channels and then applied to a common detector in phase quadrature. The sum and difference of electric vectors in phase quadrature are numerically equal so that an accurate mid-position or null balance may be ascertained on an electrical instrument in the output of the detector.

The particular advantage of utilizing electric currents in phase quadrature is due to the fact that a slight deviation from the true quadrature condition results in a marked difference in the sum and difference vectors and hence in the indication shown by a meter. In systems using in-phase or 180 degree out-of-phase vectors the rate of change when the neutralization condition is approached is very small so that the condition of true neutralization is difficult to determine and errors of considerable magnitude are likely to result.

In the operation of the device, a delay network in one channel is adjusted until the currents in the two channels are in phase and the setting of this network is a measure of the out-of-phase condition of the currents received from the microphones and, hence, the angle which the compressional wave makes with the line joining the spaced microphones.

The invention together with other objects and features will be more clearly understood from the following description and the attached drawings forming a part thereof.

In the drawings:

Fig. 1 is a schematic diagram of one form of the invention having some of the apparatus indicated in block form;

Figs. 4a, 4b and 4c are simplified vector diagrams used in explaining the operation of the system.

Figure 2:
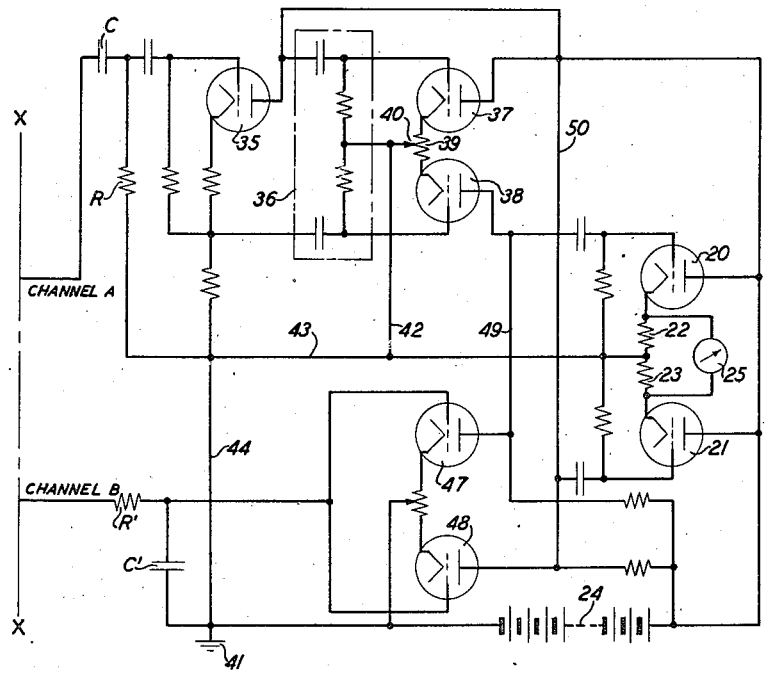
Fig. 2 illustrates a modification of the system of Fig. 1.

In Fig. 1, two microphones 10 and 10' are illustrated as connected to separate channels A and B by means of cables 11, 11'. It is to be understood that in general microphones 10 and 10' are fixed relatively to each other and that they are non-directional. In experimental use of the equipment the spacing of the devices 10, 10' was varied from one foot to twenty feet with a spacing of about eight feet preferred.

In one embodiment, where the system was used for submarine object location, devices 10 and 10' were hydrophones, that is microphones designed for use under water. The devices were attached to a frame-work adapted to be placed at the bottom of a body of water. Cables 11, 11' led from the devices to a shore installation and were connected to separate channels.

Each of the channels A and B comprises an amplifier 12, 12' and a band-pass filter 13, 13'. The amplifiers 12, 12' may be of any type but preferably are the well-known vacuum tube type. In the embodiment of the system noted above, the amplifiers comprised four stages.

As illustrated in Fig. 1, channel A is provided with a delay network 14. No corresponding network is included in channel B. One such delay network which has been used had a total delay of 400 microseconds having ten steps of which one was continuously variable. As will be readily understood, the amount of delay will depend upon the hydrophone spacing. A single stage of amplification indicated as tube 15 follows the delay network in the channel. In channel B a corresponding stage is indicated at 15'. Part of the output of each stage 15, 15' is applied to associated automatic volume controls 16, 16', respectively, adapted to control the gain of amplifiers 12 and 12' as indicated. The function of the volume control devices is to maintain the output signals from the channels substantially constant. As will appear later it is not required that the amplitudes of the signals in one channel be equal to the amplitudes of the signals in the other channel but it is desirable that the output of each channel be maintained substantially constant.

The main part of the output of stage 15 in channel A is applied to the input winding of transformer 17 and the main part of the output of stage 15' of channel B is applied to the input winding of transformer 17'.

A capacitance-resistance network comprising capacitances C and $C_1$ and resistances R and $R_1$ is associated with the output winding of transformer 17 to provide a +45 degree phase shift (at the mid-band frequency) in the currents in channel A. The mid-point of the output winding of transformer 17 is connected to the common terminal of resistances R and $R_1$ by conductor 18.

A capacitance-resistance network comprising capacitance C' and resistance R' is associated with the output winding of transformer 17' to provide a −45 degree phase shift (at the mid-band frequency) in the currents of channel B.

The two networks just noted provide a 90 degree difference in phase between the currents in the two channels.

A conductor 19 connects conductor 18 to the common terminal of resistance R' and capacitance C' in channel B.

The amplitude balance indicator of the "phase detector" comprises two tubes 20 and 21, the grids of which are connected through capacitances C and $C_1$ respectively, to the ends of the output winding of transformer 17. The cathodes of the tubes are connected through resistances 22 and 23 respectively, to ground while the anodes of the tubes are connected to a source of positive potential 24. Source 24 also provides biasing potential for the grids of the tubes.

A meter 25 which is preferably of the center zero type is connected between the cathodes of the tubes.

Before proceeding with a description of the operation of the system of Fig. 1, reference is to be made to Figs. 4a and 4b which illustrate that a small departure from the quadrature relation of vectors gives a marked difference between their sum and difference.

In Fig. 4a one vector is illustrated as $V_B$ and this may be considered to represent the voltage of the current in channel B after its phase shift, while $V_A$ may be considered to represent the voltage of the current in channel A after its phase shift. It should be noted that $V_A$ and $V_B$ are not of the same magnitude and this has been done to illustrate that the electrical quantities in the two channels may be unequal but that their sum and difference are equal numerically.

The sum of vectors $V_A$ and $V_B$ is shown as $V_{A+B}$ and the difference of the vectors is shown as $V_{A-B}$. That $V_{A+B}$ and $V_{A-B}$ are equal is obvious from Fig. 4a and this fact is well known to those skilled in the art.

In Fig. 4b the vectors are not in true quadrature. This is shown by drawing $V'_B$ at slightly less than 90 degrees to $V'_A$. The sum of these vectors is shown at $V'_{A+B}$ and the difference is shown at $V'_{A-B}$. Arcs of circles drawn with $V'_{A-B}$ and $V'_{A+B}$ as radii and with O as the center show that the difference in magnitude of the sum and difference vectors, $\Delta V'$, is quite pronounced even though departure from true quadrature relation of $V'_A$ and $V'_B$ is very slight. Hence an electric meter which indicates the amplitude difference between the sum and difference vectors will show a marked swing even when the vectors are only slightly out of quadrature.

Referring again to Fig. 1, sound or compressional waves emanating from a source remote from hydrophones 10 and 10' will impinge upon them. If the source is not in the direction of the perpendicular bisector of the line joining hydrophones 10 and 10' the waves will arrive at the hydrophones in out-of-phase relation.

The currents from the hydrophones are amplified in amplifiers 12 and 12' and then are impressed on filters 13 and 13'. These filters in one case passed a band from 2 to 10 kilocycles and in another case passed a band from 1.5 to 3 kilocycles. The frequency of the waves from the source to be located and the response characteristic of the hydrophones determine the band and the band widths of the filters.

From filter 13 in channel A the currents are impressed on delay network 14 and this network is adjusted until a zero reading is obtained on meter 25 which indicates that the delay circuit has been adjusted to the point where the currents in the two channels are in phase at the inputs to transformers 17 and 17'.

As noted above, part of the outputs of stages 15 and 15' are impressed upon automatic volume control devices 16 and 16' which control the gain of amplifiers 12 and 12'. Any satisfactory volume control device may be utilized so no details of these devices are shown.

The main part of the outputs of stages 15 and 15' are impressed on transformers 17 and 17'. The output winding of transformer 17 is connected to the grids of tubes 20 and 21 in push-pull relation, that is, the voltages impressed on the grids from transformer 17 are equal numerically but 180 degrees out-of-phase.

With the connection 19 from the common terminal of resistance R' and capacitance C' to conductor 18 which connects the mid-point of the output winding of transformer 17 to the common terminal of resistance R and $R_1$, the voltage of channel B is combined with that in channel A at the grids of tubes 20 and 21. It is, therefore, obvious that the meter 25 indicates the numerical or amplitude difference between the sum of the voltages in the two channels and the difference of the voltages in the two channels. Since the resistance-capacitance networks associated with the output windings of transformers 17 and 17' shift the phase of the voltage in channel A +45 degrees (at the mid-band frequency) and shift the phase of the voltage in channel B −45 degrees (at the mid-band frequency), the meter 25 reads zero when these voltages are 90 degrees out-of-phase which indicates that at the input to transformers 17 and 17' the voltages in the two channels are in-phase.

As indicated above, the waves impressed on the hydrophones 10 and 10' are only in-phase when the source of waves is on the perpendicular bisector of the line joining the hydrophones. For any other location of the source of the waves there will be a difference in phase of the waves impressed on the hydrophones and this difference in phase is a measure of the angle between the perpendicular bisector of the line joining the hydrophones and the line joining the mid-point of such line with the source of the waves.

The function of delay circuit 14 is to bring the voltages in the two channels into phase. The amount of delay or the readings of the delay circuit when meter 25 reads zero is, therefore, a measure of the angle at which the waves strike the hydrophones. If the phase detection were done without the use of the 90 degree phase shift the balance point of the detector would be a reading of maximum meter deflection instead of null. The rate of change of meter reading near the balance point for a small difference in phase between the signal voltages is much less for a maximum type of indication than for the null. Accurate determination of the balance point is therefore more difficult. However, as pointed out in connection with Figs. 4a and 4b when a 90 degree phase shift is employed, the rate of change in approaching neutralization is large and the meter readily indicates a slight departure from neutralization.

In Fig. 2 a modified form of "mixer" circuit is used. That part of Fig. 2 to the right of dotted line X—X may be substituted for that part of the circuit of Fig. 1 to the right of dotted line X—X of Fig. 1.

As will be seen the arrangement of Fig. 2 utilizes the single vacuum tube phase inverter in place of the transformers 17 and 17' of Fig. 1. Corresponding parts of Fig. 2 are given the same indicia as in Fig. 1.

As in Fig. 1 resistance-capacitance networks CR and C'R' cause a +45 degree phase shift in channel A and a −45 degree phase shift in channel B respectively (at mid-band frequency). The voltage of channel A is applied to the grid of tube 35 in a manner well understood in the art. The voltage from tube 35 is impressed on the grids of tubes 37 and 38 through network 36. Tubes 37 and 38 are in push-pull relationship as regards the output of tube 35, that is, the voltages applied to the grids of tubes 37 and 38 are equal numerically but 180 degrees out-of-phase. A resistance 39 connecting the cathodes of tubes 37 and 38 has associated with it a movable contact 40 which is connected to ground 41 through conductors 42, 43 and 44 whereby a high degree of balance between tubes 37 and 38 may be attained.

The voltage of channel B is applied in parallel to the grids of tubes 47 and 48, that is, the voltages applied to these grids are equal numerically and in-phase.

The anodes of tubes 38 and 47 are connected together by conductor 49 and the anodes of tubes 37 and 48 are connected together by conductor 50. The combined output voltage of tubes 38 and 47 is applied to the grid of tube 20 and the combined output voltage of tubes 37 and 48 is applied to the grid of tube 21. The voltages applied to the grids of tubes 20 and 21 are obviously the sum and difference of the voltages in channels A and B, the difference between which is indicated by meter 25.

The operation of the arrangement of Fig. 2 is the same as that of the arrangement of Fig. 1 and the description of the operation need not be repeated.

Figure 3:
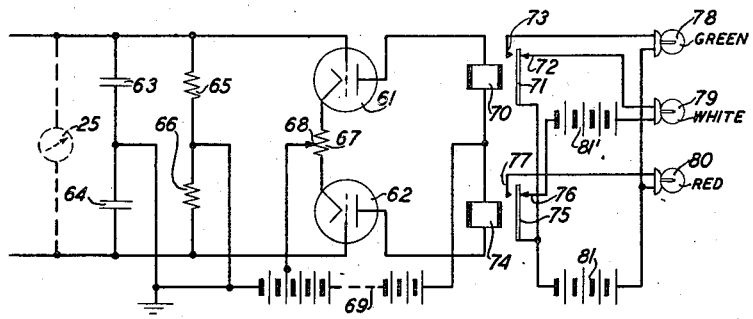
Fig. 3 is a still further modification whereby lamps are utilized to indicate the condition of the system.

Fig. 3 illustrates a further modification of or addition to the arrangements of Figs. 1 and 2 to assist in the adjustment of the delay circuit to determine the direction of the wave source. As indicated, two 3-electrode vacuum tubes 61 and 62 are associated with or may replace meter 25 and are so connected that the grid of tube 61 may have impressed upon it the sum of the voltages in channels A and B and the grid of tube 62 may have impressed upon it the difference of the voltages in channels A and B. Capacitances 63 and 64 provide a path between the grids and cathodes while resistances 65 and 66 provide leak paths for the grids. Resistance 67 with its adjustable contact 68 provides a control of the balance between tubes 61 and 62. Source 69 provides a sufficient bias on the tube grids to normally maintain the tubes 61 and 62 non-conducting. Source 69 also provides anode potentials for the tubes.

In the anode circuit of tube 61 is the winding of a relay 70 having an armature 71 and contact arms 72 and 73, and in the anode circuit of tube 62 is the winding of a relay 74 having an armature 75 and contact arms 76 and 77.

Three lamps 78, 79 and 80 are associated with the contacts of the relays and sources of electrical energy 81, 81' as shown, to operate in a manner to appear hereinafter.

Before proceeding further with the arrangement of Fig. 3 reference should be made to Figs. 4b and 4c. As explained in connection with Fig. 4b if the vectors are not 90 degrees out-of-phase there is a marked difference, $\Delta V'$, between the vector sum $V'_{A+B}$ and the vector difference $V'_{A-B}$. Also if the phase difference is less than 90 degrees, as shown in Fig. 4b, the vector sum is greater numerically than the vector difference.

If, however, the phase difference is greater than 90 degrees, as shown in Fig. 4c, it is seen by inspection that the vector sum $V''_{A+B}$ is smaller numerically than the vector difference $V''_{A-B}$ by an amount $\Delta V''$.

Referring again to Fig. 3 and assuming that the sum of the voltages in the two channels is applied to tube 61 and that the difference of the voltages in the two channels is applied to tube 62, then when the voltages are less than 90 degrees out-of-phase, the sum is numerically the larger and the voltage applied to the grid of tube 61 is large enough to overcome the bias and the tube becomes conducting. Current, therefore, flows from source 69 through the winding of relay 70 thereby energizing the relay. Armature 71 is moved out of contact with arm 72 thereby extinguishing white light 79 and into contact with arm 73 closing an obvious circuit from source 81 to light green lamp 78.

When the voltages in the two channels are more than 90 degrees out-of-phase, the bias of tube 62 is overcome and it becomes conducting. Relay 74 is thereby energized and armature 75 is moved out of contact with arm 76 and into contact with arm 77. If at this time armature 71 is in contact with arm 72, the white lamp 79 is extinguished. When contact is made between armature 75 and arm 77 an obvious circuit is completed and red lamp 80 is lighted.

Therefore, when green lamp 78 is lighted, it indicates that the voltages in the two channels are less than 90 degrees out-of-phase and when the red lamp 80 is lighted it indicates that the voltages in the two chanels are more than 90 degrees out-of-phase.

When neither tube 61 nor tube 62 is conducting, armatures 71 and 75 are in the condition shown, that is, in contact with arms 72 and 76 respectively, and the white lamp is lighted over an obvious circuit from source 81' indicating that the voltages in the two channels are 90 degree out-of-phase which in turn indicates that the delay circuit 14 of Fig. 1 has been so adjusted as to indicate the direction of the source of the waves impinging on hydrophones 10 and 10'.

This invention is particularly adapted for use in determining the bearing of an underwater sound source with respect to a given reference point, where the sound source may be a ship's propeller for example.

The invention may be carried out in other specific ways than those herein set forth without departing from the spirit and essential characteristics of the invention and the present embodiments are, therefore, to be considered in all respects as illustrative and not restrictive and all changes coming within the meaning and the equivalency range of the appended claims are intended to be embraced therein.

What is claimed is:

1. A system for indicating the direction of an object from which wave energy emanates, comprising spaced receivers adapted to translate said wave energy into electrical energy, an electrical channel for each of said receivers respectively, means for producing a phase shift of substantially 90 degrees between the signal voltages in said respective channels, means for combining said signal voltages to obtain sum and difference vectors, said last means comprising a pair of electron tubes each including a control grid, a cathode, and an anode, and circuit means for connecting both control grids to said phase shift means, each anode to the other, and each cathode to the other through a pair of serially connected resistors whose common junction point is at ground potential, and means for variably delaying transmission in one of said channels.

2. A system for determining the direction of a source of wave energy, comprising two spaced receivers adapted to translate said wave energy into electrical energy, an electrical channel for each of said receivers respectively, means for bringing the signal voltages in said channels into phase, means for shifting the phases of the voltages in the channels to a 90 degrees out-of-phase relation, means comprising a pair of electron tubes, each including a cathode connected through a resistor to ground, for combining the out-of-phase voltages to obtain sum and difference voltages, and means connected across the cathode terminals of said resistors for comparing the amplitudes of said sum and difference voltages.

3. A system for determining the direction of a source of wave energy, comprising two spaced receivers adapted to translate said wave energy into electrical energy, a transmission channel for each of said receivers respectively, a manually adjustable delay network in one of said channels, means for relatively shifting the phases of the voltages in said two channels to a substantially 90 degrees out-of-phase condition, means comprising a pair of triodes each having its cathode connected through a resistor to ground for combining the out-of-phase voltages to obtain sum and difference voltages, and means connected across the cathode terminals of said resistors for visually comparing the amplitudes of said sum and difference voltages.

4. A system for determining the direction of a source of wave energy, comprising two spaced receivers adapted to translate said wave energy into electrical energy, a transmission channel for each of said receivers respectively, means in one of said channels for producing a +45 degrees phase shift of the voltages in said channel, means in the other of said channels for producing a −45 degrees phase shift of the voltages in said other channel, and means for detecting the relative magnitudes of the sum and difference vectors of the voltages in said channels after the phase shift of such voltages, said last means including a pair of serially connected resistors whose adjacent terminals are at ground potential, and means connected across the opposite terminals of said resistors for indicating the relative magnitudes of such vectors.

5. A system in accordance with claim 3 in which said comparing means comprises three lights of different colors, means for energizing one of said lights when said voltage sum exceeds in amplitude said voltage difference, means for energizing another of said lights when said voltage difference exceeds in amplitude said voltage sum, and means for energizing the third of said lights when the amplitude of said voltage sum equals the amplitude of said voltage difference.

JAMES B. HAYS, Jr.